3,141,823
METHOD FOR PRODUCING ANALGESIA

Paul Adriaan Jan Janssen, Vosselaar, near Turnhout, Belgium, and Joseph Francis Gardocki, Doylestown, Pa., assignors to Research Laboratorium Dr. C. Janssen N.V., a corporation of Belgium
No Drawing. Filed Sept. 4, 1962, Ser. No. 221,936
5 Claims. (Cl. 167—65)

This invention relates to a novel combination and to the use for this combination.

One of the most ancient problems in the field of medicine is the relief of pain by means of drugs. Whatever may be the cause or origin of pain in a particular individual, the administration of drugs is intended to produce a state of decreased awareness of the sensation, accompanied by an increased pain threshold.

Almost all potent analgesics evoke reactions other than the relief of pain. These include gastrointestinal disturbances, nausea, constipation and vomiting. Among the more serious of the side reactions, however, and one most commonly found in analgesic drugs, is respiratory depression. Hence, the use of analgesics in man involves considerations other than the primary effect (analgesia), since side effects and addiction liability play an extremely important part in the total evaluation of a drug as an effective analgesic.

It will be seen therefore that the clinician and the clinical pharmacologist are most favorably inclined to use drugs for pain relief which have a maximum analgesic effect accompanied by minimum side reactions. Obviously it is difficult to satisfy these requirements within one chemical entity. In practice one frequently finds that a given drug either has a potent analgesic effect with concomitant, and serious, side reaction parameters; or it produces few, if any, side effects but very little analgesic effect as well.

Thus, the approach frequently employed by investigators in this field is the discovery of a combination of two or more drugs in such quantity and in such proportion as to produce maximum analgesia with minimum or no side effects. If none of the components of the combination possesses, individualy, analgesic properties— whereas the combination does, the net effect of the combination is commonly known as "synergism." If, on the other hand, one of the components of the combination is known to possess pain-relieving properties but these properties are increased many-fold with concurrent elimination (or reduction) of known side reactions when the analgesic is combined with one or more other drugs, then the net effect of the combination is commonly refered to as "potentiation."

We have now discovered a novel combination of two chemical compounds, one of which already per se possesses analgesic properties, which novel composition finds new applications in the field of medicine. The new uses are not obtainable by means of either of the two compounds when administered without the other, but are made possible solely and entirely because of the potentiating net effect brought about by the novel combination.

The novel combination of this invention comprises (a) the compound N - phenyl-N-[4-(1-phenethylpiperidinyl)]-propionanilide, hereinafter for sake of convenience and brevity referred to generically as "phentanyl" and (b) the compound 1-[1-{4-(p-fluorophenyl)-4-oxobutyl}-1,2,3,6-tetrahydro-4-pyridyl] - 2 - benzimidazolone hydrate, hereinafter, for the foregoing reasons, referred to as "dehydrobenzperidol." Phentanyl is an analgesic. Dehydrobenzperidol is a tranquilizer. It is devoid of analgesic properties.

Phentanyl, which may also be assigned the name N-[1-(β-phenylethyl)-4-piperidyl]-propionanilide, has the following structure:

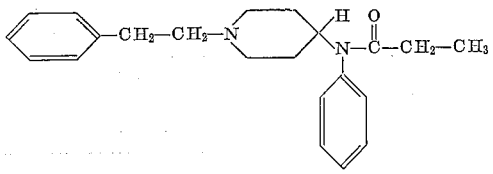

Dehydrobenzperidol, which may also be identified as (a) 4'-fluoro-4-[N-4''-(N-benzimidazolone) - Δ3,4-tetrahydropyridino]-butyrophenone hydrate, or as (b) 1 - {1-[γ-(4 - fluorobenzoyl) - propyl] - 1,2,3,6 - tetrahydro-4-pyridyl}-2-benzimidazolinone hydrate, has the following structure:

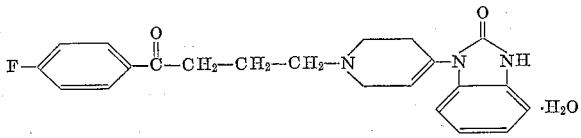

Evidence that the analgesic effect of phentanyl is potentiated by dehydrobenzperidol is obtainable by the technique of Branchi and Franceschini [Brit. J. Pharmacol. 9, 280 (1954)]. Briefly, this method comprises placing an arterial clip, the jaws of the clip being covered with thin rubber tubing, on the root of the tail of a mouse for 30 seconds. If, following drug treatment, the animal does not bite the clip within the allotted period, the drug is considered ot have induced an analgesic effect. The untreated animals always bite the clip when it is placed on the base of the tail. In our studies we observed that the animal vocalized in addition to biting at the clip of the tail. This second parameter was also taken into account in our experiments. Thus, for an analgesic effect to be present the animal must neither vocalize nor bite the clip. In the data given in Tables I-IV below, the drugs were given in the form of 0.1 molar tartaric acid solutions subcutaneously to white albino mice.

Table I shows the results obtained when phentanyl is administered in the doses indicated. Following administration at 0.1 mg./kg. concentration, analgesic effect is observed within 4 minutes, maximum activity in 10 minutes, dissipation of effect at the end of 30 minutes. The $ED_{50}$, conducted at 10 minutes following injection, and 95% confidence limits are 0.08 (0.045–0.142) mg./kg.

TABLE I

| Dose, mg./kg. | Percent Block | |
|---|---|---|
| | Biting | Vocalization |
| 0.50 | 100 | 100 |
| 0.10 | 50 | 50 |
| 0.05 | 30 | 30 |
| 0.01 | 10 | 10 |

Table II shows the results obtained when dehydrobenzperidol is administered in the doses indicated, the analgesic activity being studied at 10 minutes following doses of 0.5–75 mg./kg. The $ED_{50}$ and 95% confidence limits: ≅50 mg./kg.

TABLE II

| Dose, mg./kg. | Percent Block | |
|---|---|---|
| | Biting | Vocalization |
| 75 | 40 | 0 |
| 50 | 60 | 0 |
| 30 | 30 | 0 |
| 15 | 30 | 0 |
| 10 | 40 | 0 |
| 5 | 10 | 0 |
| 1 | 0 | 0 |
| 0.5 | 0 | 0 |

Table III shows the results obtained when phentanyl per se and dehydrobenzperidol-phentanyl combinations are administered in the proportions and doses indicated. The $ED_{50}$ and 95% confidence limits for each case are as indicated.

TABLE III

| | Phentanyl | Percent Block Dehydrobenzperidol:Phentanyl | | | |
|---|---|---|---|---|---|
| | | 100:1 | 50:1 | 25:1 | 10:1 |
| Dose of Phentanyl, mg./kg.: | | | | | |
| 0.50 | 100 | | | 100 | 100 |
| 0.10 | 50 | | 90 | 80 | 60 |
| 0.05 | 30 | 90 | 80 | 50 | 40 |
| 0.04 | | 50 | | | |
| 0.03 | | | 50 | | |
| 0.02 | | | 10 | | |
| 0.01 | 10 | 30 | 0 | 20 | 10 |
| 0.005 | | 0 | | | |
| $ED_{50}$ and 95% Confidence Limits | 0.08 (.045–.142) | 0.025 (.015–.041) | 0.028 (.018–.043) | 0.05 (.023–.11) | 0.064 (.036–.112) |
| Potency Ratio | 1 | 3.2 | 2.86 | [1]1.6 | [1]1.25 |

[1] Not sig. P. >.05.

On the basis of the results given in the above tables it will be readily observed that dehydrobenzperidol significantly potentiates the analgesic activity of phentanyl. The $ED_{50}$ for phentanyl per se is 0.08 mg./kg. whereas when dehydrobenzperidol is combined with phentanyl in ratios of 100:1 and 50:1 a significant potentiation is observed. The $ED_{50}$ for the 100:1 mixture is 0.025 mg./kg. and for the 50:1 mixture it is 0.028 mg./kg. Statistical analysis of these doses shows that increased potency is significant as the P. >0.05 level and that dose response curves for the combination of dehydrobenzperidol and phentanyl parallel with curves for phentanyl per se.

The operative ratios of dehydrobenzperidol:phentanyl for the purpose of this invention, based on the data given above, may be varied from about 10:1 to about 100:1, the preferred range being from about 50:1 to about 100:1. The duration of the analgesic activity of the combination is no greater than that of phentanyl per se. This is an indication that the enhanced activity of the combination is a true potentiation of the analgesic activity of phentanyl by dehydrobenzperidol, rather than an interference in the metabolism of phentanyl.

In toxicity studies (Table IV) the $LD_{50}$ for dehydrobenzperidol is 125 (106–148) mg./kg. and that for phentanyl is 62 (27–142) mg./kg. The $LD_{50}$'s of the various combinations of dehydrobenzperidol (100:1, 50:1, 25:1, 10:1, and 5:1) do not differ significantly from the $LD_{50}$ for dehydrobenzperidol alone. Tests for parallelism of the dose response curves show that the curves for the combinations are parallel to the curves for dehydrobenzperidol and not parallel to the curve for phentanyl. This suggests that the potentiation is not paralleled by increase in toxicity.

TABLE IV

| | Percent Mortality | | | | | | |
|---|---|---|---|---|---|---|---|
| | Phentanyl | Dehydrobenzperidol | Dehydrobenzperidol:Phentanyl Ratios | | | | |
| | | | 100:1 | 50:1 | 25:1 | 10:1 | 5:1 |
| Dose, mg./kg.:[1] | | | | | | | |
| 500 | | | | | | | 100 |
| 300 | | | | | | | 100 |
| 250 | | | | | | 100 | |
| 200 | | 100 | 100 | 70 | 90 | | 90 |
| 175 | 100 | | | | | 100 | 80 |
| 170 | | | | | | | 70 |
| 150 | | 70 | 70 | 60 | | 90 | |
| 125 | | 60 | | 70 | 50 | 60 | 80 |
| 120 | | | | | | 30 | |
| 100 | | 60 | 20 | 10 | 50 | 60 | 70 |
| 85 | | | | | | 0 | 80 |
| 75 | | | | 10 | | | 80 |
| 62.5 | | | | | 20 | | 30 |
| 60 | | | | | 20 | | |
| 50 | 40 | 0 | 0 | 10 | 0 | | 30 |
| 25 | | | | 0 | | | 0 |
| 10 | 20 | | | | | | |
| 8 | 0 | | | | | | |
| 7 | | | | | | | |
| 5 | 0 | | | | | | |
| 4 | 20 | | | | | | |
| 3 | 40 | | | | | | |
| 2.0 | 0 | | | | | | |
| LD 50, mg./kg., 95% confidence. | 62 [27–142] | 125 [106–148] | 152 [130–178] | 115 [94–142] | 105 [86–128.1] | 140 [123–160] | 96 [73.2–125.7] |

[1] Doses listed in terms of dehydrobenzperidol equivalents in combination.

Since the $ED_{50}$ for the 100:1 combination in phentanyl equivalents is 0.025 mg./kg., the accompanying dose of dehydrobenzperidol is 2.5 mg./kg., it is apparent that a wide safety margin exists. In terms of dehydrobenzperidol, the therapeutic index is 50 and in terms of phentanyl it is 2480.

As indicated previously, the new combination of dehydrobenzperidol:phentanyl finds many novel applications in the field of medicine which are not possible with either of these drugs alone. Illustrative of such unique utility, but not limitative upon the novel broad combination, is the use of the novel composition in neuroleptanalgesia. This is an anaesthetic technique involving the intravenous administration of the novel dehydrobenzperidol:phentanyl composition in ratios varying from 25:1 to 100:1 together with the inhalation of nitrous oxide for general anaesthesia. The optimal ratio is 50:1, and containing 1 mg./ml. dehydrobenzperidol together with 0.02 mg./ml. phentanyl.

In actual practice, about 5 ml. of a 50:1 dehydrobenzperidol:phentanyl mixture are administered intravenously, followed by another 3 ml. if sedative effect is not observed. A 75:25 mixture of nitrous oxide-oxygen is started when drowsiness develops. Maintenance depends upon operative procedure. Nitrous oxide:oxygen, 3:1, is administered continuously.

The use of the novel composition as an inductive agent in nitrous oxide anaesthesia presents advantages over other agents presently known. For example, thiopental is devoid of analgesic properties; morphine produces hypotension and is too long-acting for easy control; meperidine causes tachycardia, nausea and vomiting.

An outstanding property of the novel dehydrobenzperidol/phentanyl combination, as it relates to neuroleptanalgesia, is the antagonistic effect of dehydrobenzperidol upon the respiratory inhibition caused by phentanyl. This antagonistic effect is demonstrable in dehydrobenzperidol:phentanyl ratios of 1:1 to 50:1 and higher.

One of the disadvantages of administering analgesics during surgery is that rigid control of respiration is obligatory. Hence, additional drug must be given during and after intervention to correct insufficient ventilation. However, in the case of the novel dehydrobenzperidol/phentanyl combination almost no influence on respiration is observed, thus permitting surgery to be carried out under considerably safer conditions without administration of other drugs to correct respiratory depression.

The antagonistic effect of dehydrobenzperidol upon the respiratory depression caused by phentanyl is illustrated by the results given in Table V (blood pressure and respiration in anesthetized dogs) where data are presented for 26 different parameters with respect to each of the components individually and upon different ratios of the novel combination.

TABLE V

| Parameters | Dehydrobenzperidol | Phentanyl | Dehydrobenzperidol-Phentanyl |
|---|---|---|---|
| Examin. doses at slow infusion rate, mg./min.¹ | 0.1 / 0.5 / 5.0 | 0.01 / 0.1 | 0.1:0.1. / 0.5:0.01. / 5.0:0.1. |
| Systolic and Diastolic blood pressure | slight hypertension | slight hypertension | None or slight hypotension. |
| Mean pulmonary artery pressure | none or slight increase. | increase | slight increase. |
| Right atrium pressure | decrease | slight increase | none or slight decrease. |
| Heart rate | tachycardia | bradycardia | Do. |
| Cardiac output | slight increase | decrease | no effect. |
| Stroke volume | decrease | increase | Do. |
| Total peripheral resistance | do | do | none or slight decrease. |
| Art. Brachialis Flow | increase | decrease | increase. |
| Peripheral Resistance (art. brach. flow) | decrease | increase | decrease. |
| Respiratory Tidal Volume | increase | decrease | none or slight decrease. |
| Respiratory Rate | do | do | no effect. |
| Oxygen saturation arterial blood | slight increase | do | none or slight decrease. |
| Oxygen saturation coronary sinus blood | no effect | do | no effect. |
| Carbon dioxide alveolar | decrease | increase | none or slight decrease. |
| Respiratory response to carbon dioxide stimul | increase | decrease | Do. |

¹ 0.5 ml./min./I.V.

Preparation of Dehydrobenzperidol

A mixture of 10 parts of γ-chloro-4-fluorobutyrophenone, 5.5 parts of 1-(2,2,3,6-tetrahydro-4-pyridyl)-2-benzimidazolinone, 4 parts of sodium carbonate, and 0.1 part of potassium iodide in 176 parts of 4-methyl-2-pentanone is stirred and refluxed for 64 hours. The cooled reaction mixture is filtered and the solvent is evaporated from the filtrate to leave an oily residue which is dissolved in toluene. The toluene solution is filtered and the solvent is evaporated. The resultant residue is recrystallized from a mixture of 32 parts of ethyl acetate and 32 parts of diisopropyl ether to give 1-{1-[-(4-fluorobenzoyl)propyl]-1,2,3,6-tetrahydro-4-pyridyl} - 2 - benzimidazolinone hydrate melting at about 145–146.5° C.

Preparation of Phentanyl

To the stirred solution of 5 parts of N-(4-piperidyl)-propionanilide, 6.85 parts sodium carbonate, 0.05 part potassium iodide in 120 parts hexone is added portionwise a solution of 3.8 parts β-phenylethyl chloride in 24 parts 4-methyl-2-pentanone. The mixture is stirred and refluxed for 27 hours. The reaction mixture is filtered while hot, and the filtrate is evaporated. The oily residue is dissolved in 160 parts diisopropyl ether and the solution is filtered several times until clear, then concentrated to a volume of about 70 parts. The residue is then cooled for about 2 hours at temperatures near 0° C. to yield N-[1 - (β-phenylethyl)-4-piperidyl]-propionanilide, melting at about 83–84° C.

Depending upon the preference of one skilled in the art the components of the novel combination may be used in admixture in the form of any one of a wide variety of salts including the therapeutically effective, nontoxic forms: hydrochlorides, hydrobromides, sulfates, nitrates, phosphates, acetates, propionates, glycolates, oxalates, malonates, formates, maleates and, preferably, tartrates, lactates, citrates, benzoates and dihydrogen citrates.

Preferred for purposes of this invention are the tartrates, dihydrogen citrates and lactates in aqueous media suitable for parenteral administration, i.e. subcutaneously, intradermally, intramuscularly or intravenously. Also includable within the scope of this invention are orally administrable forms of the novel combination, i.e. as pills, capsules, powders or tablets. If desired, the combination may be admixed with other therapeutic agents compatible with each of the respective components.

What is claimed is:

1. A new composition containing from about five to about one hundred parts by weight of a compound having the structure:

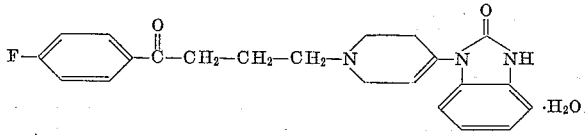

and one part by weight of a compound having the structure:

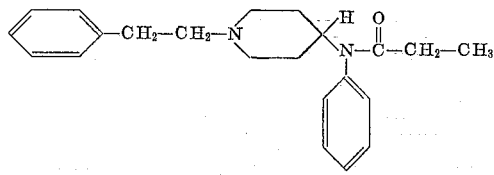

2. A new composition containing about fifty parts by weight of 1-[1-{4-(p-fluorophenyl)-4-oxobutyl}-1,2,3,6-tetrahydro-4-pyridyl]-2 - benzimidazolone hydrate and about one part by weight of N-phenyl-N-[4-(1-phenethylpiperidinyl)]-propionanilide.

3. A new composition containing from about 5 to about 100 parts by weight of 1-[1-{4-(p-fluorophenyl)-4-oxobutyl}-1,2,3,6-tetrahydro-4-pyridyl]-2 - benzimidazolone hydrate in the form of a therapeutically acceptable nontoxic salt and about one part N-phenyl-N-[4-(1-phenethylpiperidinyl)]-propionanilide in the form of a therapeutically acceptable salt in admixture with a pharmaceutical carrier.

4. In a method for producing neuroleptanalgesia, the step which comprises administering intravenously from about twenty-five to about one hundred parts by weight of 1-[1-{4-(p-fluorophenyl)-4-oxobutyl} - 1,2,3,6 - tetrahydro-4-pyridyl]-2-benzimidazolone hydrate in the form of a therapeutically acceptable salt and about one part by weight of N-phenyl-N-[4-(1-phenethylpiperidenyl)]-propionanilide in the form of a therapeutically acceptable salt.

5. In a method for producing neuroleptanalgesia, the step which comprises administering intravenously about fifty parts by weight of 1-[1-{4-(p-fluorophenyl)-4-oxobutyl} - 1,2,3,6-tetrahydro-4-pyridyl]-2-benzimidazolone hydrate in the form of a therapeutically acceptable salt, and about one part by weight of N-phenyl-N-[4-(1-phenethylpiperidinyl)]-propionanilide in the form of a therapeutically acceptable salt.

References Cited in the file of this patent

UNITED STATES PATENTS

| | | |
|---|---|---|
| 2,824,875 | Elpern | Feb. 25, 1958 |
| 2,914,532 | Elpern | Nov. 24, 1959 |
| 2,962,501 | Cutter | Nov. 24, 1959 |
| 3,004,977 | Janssen | Oct. 17, 1961 |
| 3,012,030 | Janssen | Dec. 5, 1961 |